US006646547B2

(12) United States Patent
Chiu

(10) Patent No.: US 6,646,547 B2

(45) Date of Patent: Nov. 11, 2003

(54) LIGHT-PRODUCING WARNING DEVICE FOR SKATEBOARD

(75) Inventor: Cheng-pang Chiu, Taipei (TW)

(73) Assignee: Top Rank Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/095,943

(22) Filed: Mar. 13, 2002

(65) Prior Publication Data

US 2002/0135464 A1 Sep. 26, 2002

(30) Foreign Application Priority Data

Mar. 23, 2001 (TW) ...................................... 90204518 U

(51) Int. Cl.[7] .......................... G08B 23/00; G08B 5/36; E21V 21/08; B62M 1/00; A43B 23/00

(52) U.S. Cl. ............. 340/321; 340/815.48; 340/815.52; 362/103; 362/459; 280/87.042; 36/137

(58) Field of Search ........................... 540/321, 815.42, 540/815.47–815.52; 320/107, 112, 113; 200/83 R, 83 J, 512, 516, 11 G; 362/459, 464, 84, 103; 280/87.042; 36/136, 137

(56) References Cited

U.S. PATENT DOCUMENTS 3,582,596 A * 6/1971 Woodhead ............... 200/318.1
3,944,803 A * 3/1976 Chao .......................... 362/108
4,147,969 A * 4/1979 Miller et al. ................ 320/113
4,227,140 A * 10/1980 Nardella et al. ............ 320/113
4,991,066 A * 2/1991 McCowan .................. 362/464
4,997,196 A * 3/1991 Wood .................... 280/87.042
5,575,554 A * 11/1996 Guritz ........................ 362/103
5,661,276 A * 8/1997 Shibata .................... 200/61.54
5,746,500 A * 5/1998 Chien ......................... 362/103
5,921,653 A * 7/1999 Chien ......................... 362/103
6,082,867 A * 7/2000 Chien .......................... 362/84

* cited by examiner

*Primary Examiner*—Daniel J. Wu
*Assistant Examiner*—Anne V. Lai
(74) *Attorney, Agent, or Firm*—Bacon & Thomas, PLLC

(57) ABSTRACT

A light-producing warning device for skateboard includes a case connected to an underside of a deck of the skateboard for accommodating batteries; a control circuit unit mounted in the case to electrically connect to the batteries and including a switch; a cover closing the case and having a push button provided thereat corresponding to the switch on the control circuit unit; at least one light-emitting element attached to an outer periphery of the deck and connected to wires extended from the switch; and at least one light-transferring strip connected to the light-emitting element and fixed to the outer periphery of the deck with fixing nails and having a plurality of through holes spaced thereon. By pushing the push button to touch the switch, light is emitted by the light-emitting element to pass through the light-transferring strip and form light spots on the spaced through holes to provide good warning effect.

1 Claim, 6 Drawing Sheets

LIGHT-PRODUCING WARNING DEVICE FOR SKATEBOARD

FIELD OF THE INVENTION

The present invention relates to a light-producing warning device for skateboard, and more particularly to a warning device for mounting to an underside of a skateboard to emit light or flashes under control of a control circuit unit. The emitted light or flashes pass through light-transferring strips connected to an outer periphery of the skateboard to provide good warning effect.

BACKGROUND OF THE INVENTION

Conventional skateboards are not provided with any luminous warning device. It is very dangerous for users to play skateboards without luminous warning device, particularly when playing the skateboards in a dark environment. It is therefore desirable to develop a light-producing warning device for skateboard to ensure the safety of players.

SUMMARY OF THE INVENTION

A primary object of the present invention is to provide a light-producing warning device for a skateboard. The warning device includes batteries to supply power needed by one or more light-emitting elements to emit light or flashes, and one or more light-transferring strips connected to an outer periphery of the skateboard to provide paths for the emitted light or flashes to reach the periphery of the skateboard as a warning.

Another object of the present invention is to provide a light-producing warning device for a skateboard that has simple structure and can be easily installed and operated.

A further object of the present invention is to provide a light-producing warning device for a skateboard that includes one or more light-emitting elements for emitting lights and one or more light-transferring strips having a plurality of spaced through holes for connecting to an outer periphery of the skateboard. Lights emitted by the light-emitting elements pass through the light-transferring strips and are reflected and refracted at the through holes to form bright light spots, so that only limited number of light-emitting elements is needed for the warning device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 1A is a partially enlarged view of FIG. 1 showing a control circuit unit for the warning device;

FIG. 1B is a partially enlarged view of FIG. 1 showing a push button for the warning device;

FIG. 3A is a partially enlarged view of FIG. 3 showing the connection of wires of the warning device to a light-emitting element located at an outer periphery of the skateboard;

FIG. 3B is a partially enlarged view of FIG. 3 showing a push button and a switch for the warning device;

DETAILED DESCRIPTION OF THE PREFERRED EMBODIMENTS

Figure 1:
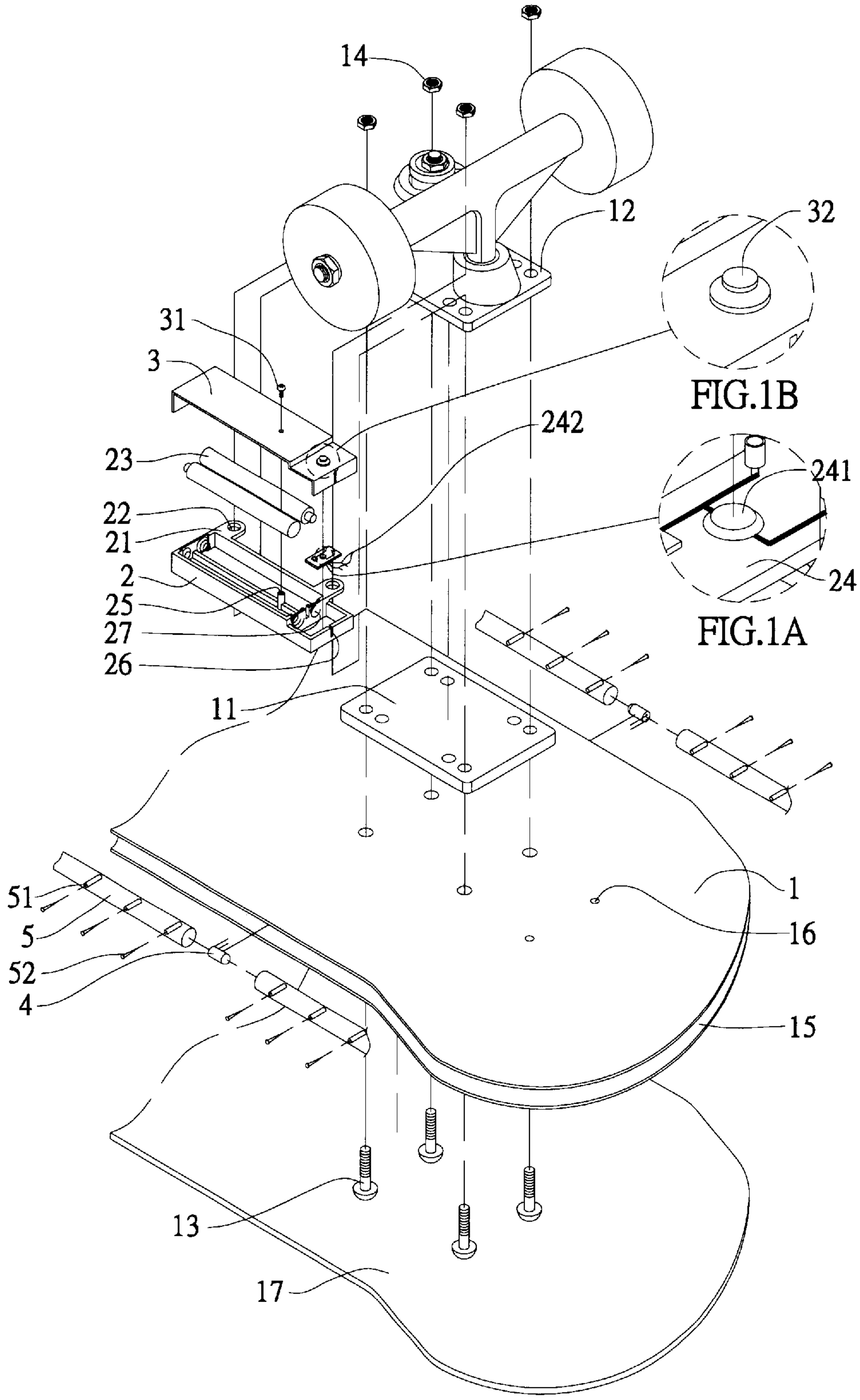
FIG. 1 is an exploded perspective view of a light-producing warning device for a skateboard according to a first embodiment of the present invention.
Figure 2:
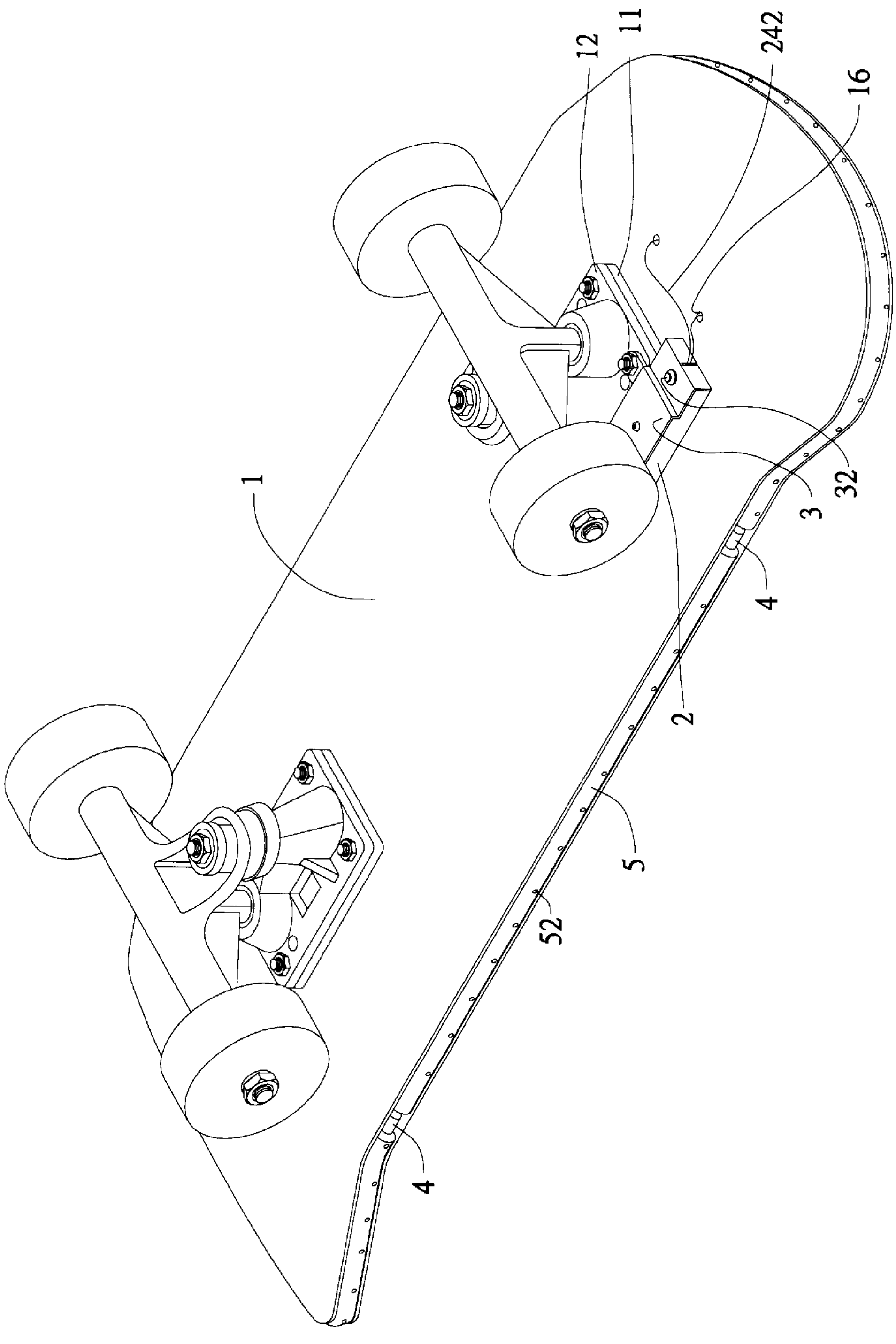
FIG. 2 is an assembled perspective view of the light-producing warning device for the skateboard of FIG. 1.

Please refer to FIGS. 1 and 2 that are exploded and assembled perspective views, respectively, of a light-producing warning device according to a first embodiment of the present invention for mounting to an underside of a deck 1 of a skateboard. The warning device mainly includes an open-topped case 2, a control circuit unit 24 located in the case 2, a cover 3 closing the open top of the case 2, at least one light-emitting element 4 attached to an outer periphery of the deck 1, and at least one light-transferring strip 5 mounted around the outer periphery of the deck 1.

The case 2 is provided at one side with two outward projected lugs 21, on each of which a through hole 22 is provided. By extending screws 13 through holes provided on the deck 1 and a base plate 11 and a wheel supporter seat 12 for a wheel supporter assembly of the skateboard as well as the through holes 22 of the lugs 21 to engage with nuts 14, the case 2 is fixedly connected to the deck 1 to one side of the wheel supporter seat 12. The case 2 defines an inner space in which batteries 23 are mounted.

The control circuit unit 24 is also mounted in the case 2 to locate at an end of the batteries 23, such that it is electrically connected to leaf springs 27 of the batteries 23. Please also refer to FIG. 1A. The control circuit unit 24 includes a switch 241 for sending signals to the at least one light-emitting element 4 via wires 242 extended from one side of the control circuit unit 24.

The cover 3 is closed onto the open top of the case 2 by extending a screw 31 through the cover 3 to engage with an internally threaded locating post 25 provided in the case 2. A push button 32 is fixedly mounted on the cover 3 corresponding to the switch 241 of the control circuit unit 24 in the case 2. After the cover 3 is closed onto the case 2 to form a box, the wires 242 of the control circuit unit 24 are guided out of the box via a notch 26 provided at an end of the box.

The light-emitting element 4 is connected at two ends to the light-transferring strip 5. The light-transferring strip 5 is made of a highly transparent, abrasion-proof, and impact-resistant material. A plurality of through holes 51 are spaced along the light-transferring strip 5 at predetermined intervals, so that the light-transferring strip 5 and the light-emitting element 4 connected thereto can be fixed to the outer periphery of the deck 1 by fixing nails 52 separately extended through the holes 51 into the deck 1. The deck 1 may be provided along its outer periphery with a groove 15 for receiving the at least one light-transferring strip 5 and light-emitting element 4 therein. The wires 242 connected to the light-emitting element 4 are also fixed along the outer periphery of the deck 1 behind the light-transferring strip 5 by the fixing nails 52, as shown in FIG. 3A.

Figure 3:
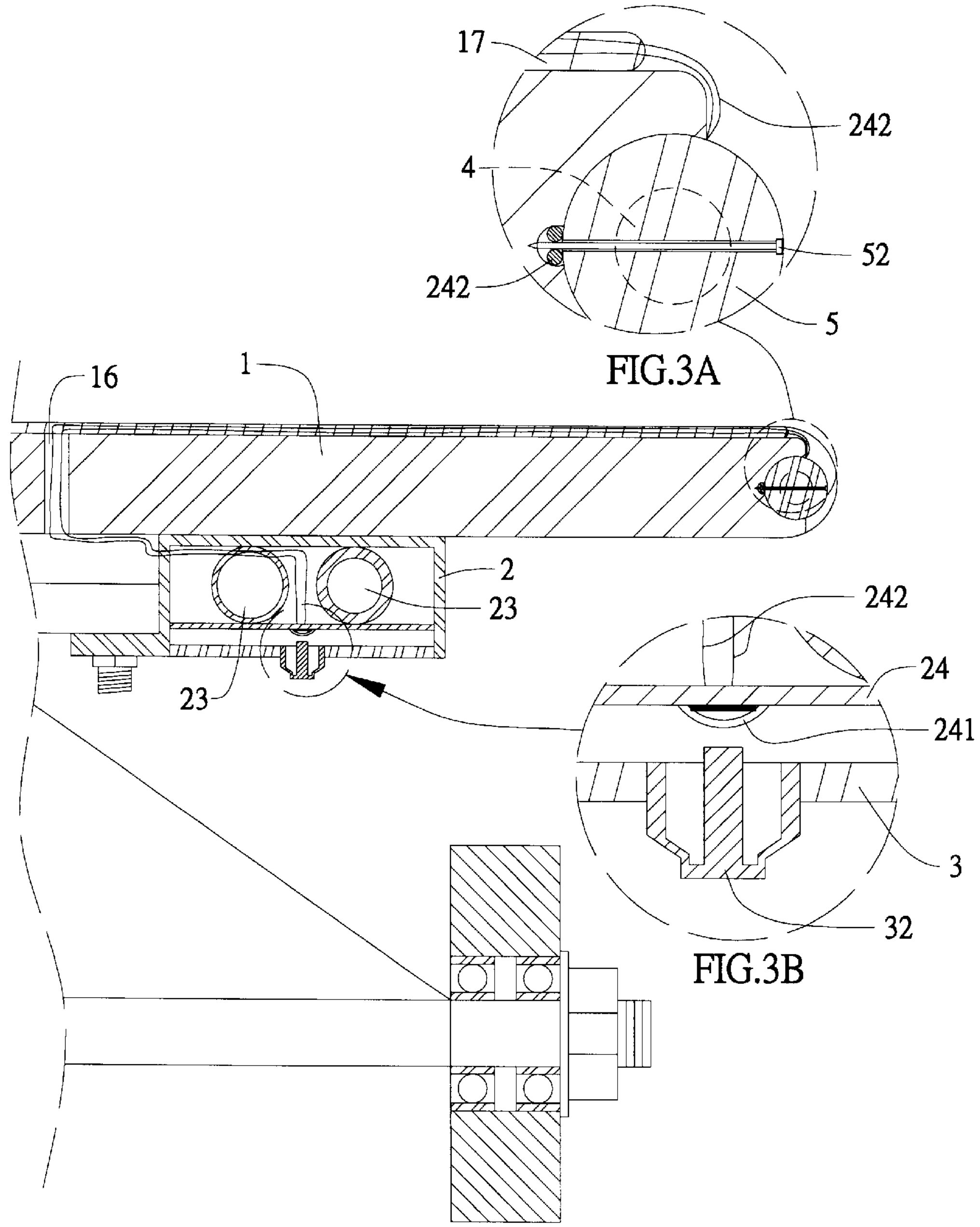
FIG. 3 is an assembled sectional view of the light-producing warning device for the skateboard of FIG. 1.

Please refer to FIG. 3 that is an assembled sectional view showing the light-producing warning device according to the first embodiment of the present invention, and to FIG. 3B that is a partially enlarged view of FIG. 3 showing the switch 214 and the push button 32. When the push button 32 on the cover 3 is pushed once to touch the switch 241 on the control circuit unit 24 in the case 2, a signal is sent from the control circuit unit 24 to the at least one light-emitting element 4 for the latter to emit light continuously. The light emitted by the light-emitting element 4 passes through the at least one light-transferring strip 5 and is visible along the outer periphery of the deck 1. When the light passes the through holes 51 on the light-transferring strip 5, it is reflected and refracted to form bright light spots. When the push button 32 is pushed for a second time to touch the switch 241 again, another signal is sent to the at least one light-emitting element 4 for the same to emit intermittent lights that pass through the at least one light-transferring strip 5 to show flashes along the outer periphery of the deck 1. Again, the intermittent lights pass the through holes 51 to form flashing light spots thereat. To turn off the light-producing warning device, simply push the push button 32 for a third time to touch the switch 241 again. At this point, a further signal is sent from the control circuit unit 24 to the at least one light-emitting element 4 for the same to turn off. The light-producing warning device can be conveniently operated in the above-described manner to provide good warning effect, enabling a user to use the skateboard safely.

The wires 242 extended from the closed case 2 and cover 3 are extended through wire holes 16 provided on the deck 1 to a top of the deck 1, as can be seen in FIGS. 2 and 3. The wires 242 on the top of the deck 1 are then connected to the light-emitting element 4, as shown in FIG. 3A. A layer of antislip paper 17 is attached to the top of the deck 1 to cover the wires 242, protecting the latter from breaking when the skateboard is vibrated, impacted or abrasively contacted with other articles. Alternatively, the groove 15 may be omitted from the deck 1 of the skateboard. In this case, the at least one light-emitting element 4 and the at least one light-transferring strip 5 are directly clamped to the outer periphery of the deck 1 with clamping means (not shown) and then fixed to the deck 1 by extending the fixing nails 52 through the holes 51 into the deck 1.

The switch 241 of the control circuit unit 24 may be in the form of a spring plate, a diaphragm, or a push button. The wires 242 connected to the light-emitting element 4 may be further parallelly or serially connected to other light-emitting elements to provide increased brightness along the outer periphery of the deck 1. However, since the through holes 51 on the light-transferring strip 5 reflect and refract light passing therethrough to form highly bright light spots, only a limited number of light-emitting elements 4 would be sufficient for the warning device of the present invention to produce lights and good warning effect.

Figure 4:
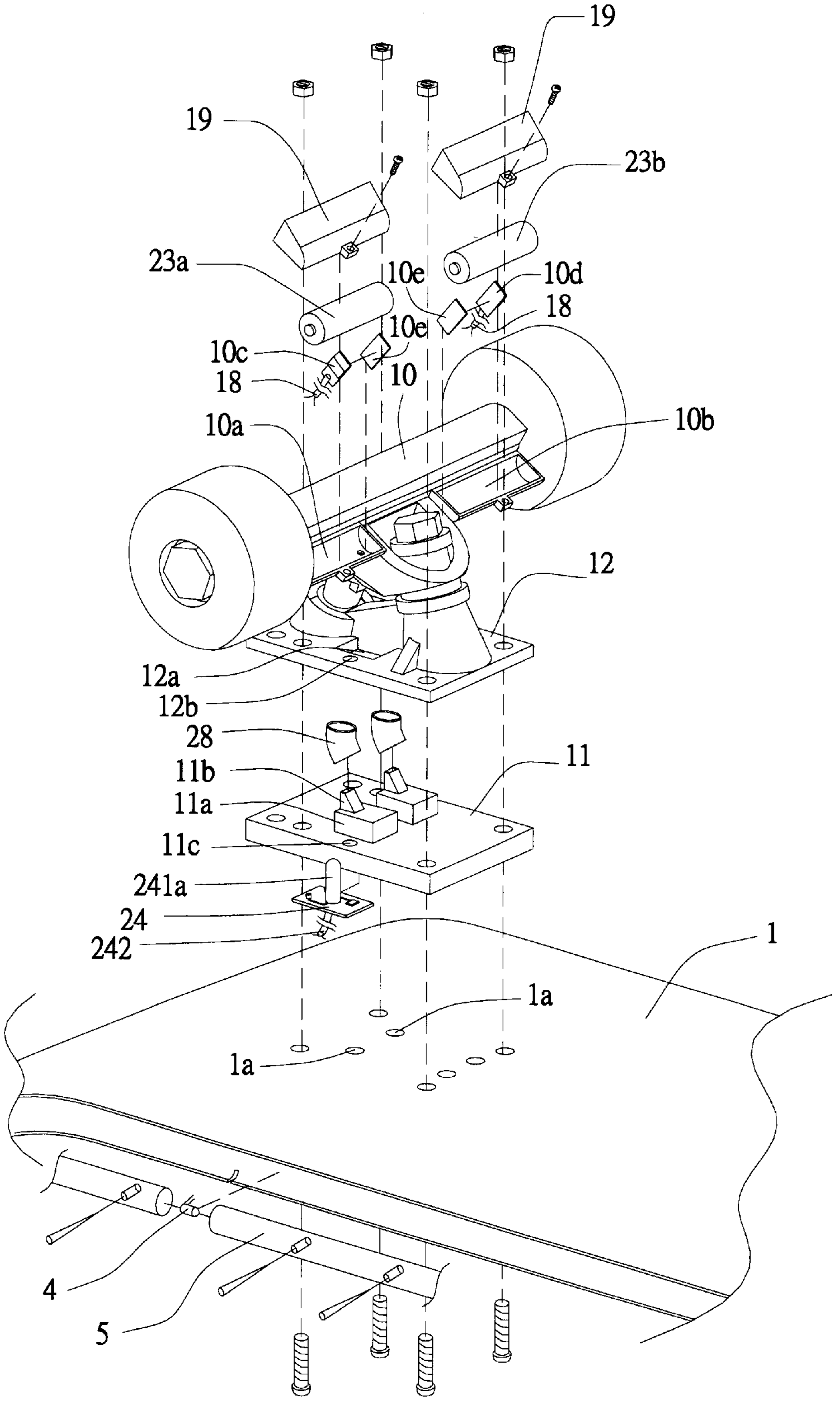
FIG. 4 is an exploded perspective view of a light-producing warning device for a skateboard according to a second embodiment of the present invention.
Figure 5:
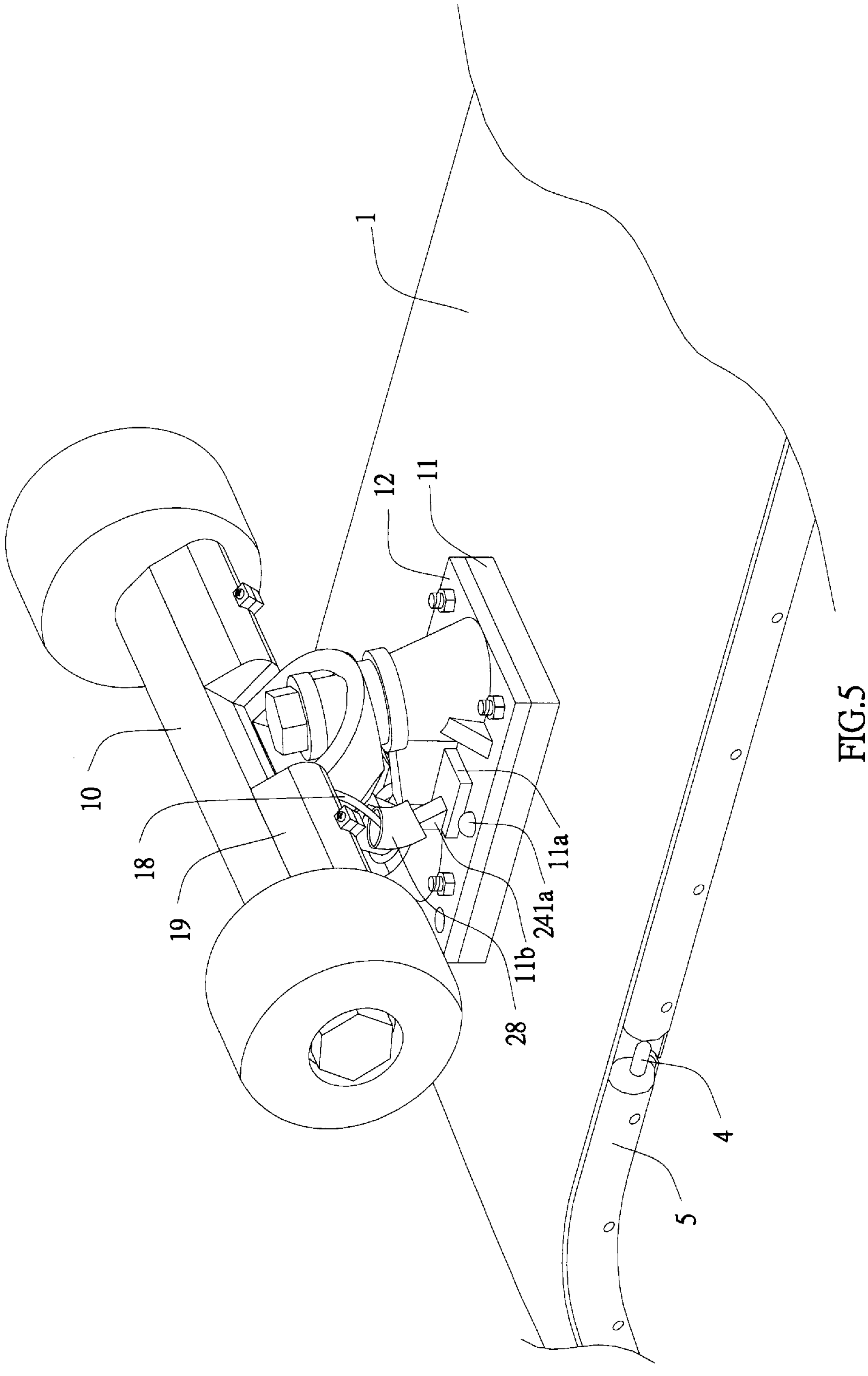
FIG. 5 is an assembled sectional view of the light-producing warning device for the skateboard of FIG. 4.

FIGS. 4 and 5 are exploded and assembled perspective views, respectively, of a light-producing warning device for skateboard according to a second embodiment of the present invention.

In the second embodiment, the warning device is associated with a wheel axle 10 of the skateboard. The wheel axle 10 is made of a conductive material and is formed of two axially spaced chambers 10*a*, 10*b* openably closed by two covers 19 with screws. The two chambers 10*a*, 10*b* define two inner spaces for accommodating batteries 23*a*, 23*b* therein. Spring plates 10*c*, 10*d* are separately fixedly connected to inner ends of the chambers 10*a*, 10*b* to contact with negative and positive poles of the batteries 23*a*, 23*b*, respectively, and thereby elastically push positive and negative poles of the batteries 23*a*, 23*b*, respectively, against outer ends of the chambers 10*a*, 10*b* to form a closed circuit. The spring plates 10*c*, 10*d* are separately connected to wires 18 that are then extended out of the chambers 10*a*, 10*b* via holes provided at bottoms thereof. To avoid leakage of current via the wheel axle 10 that is made of a conductive material, two insulating pads 10*e* are separately provided between the spring plate 10*c* and the inner end of the chamber 10*a*, and between the spring plate 10*d* and the inner end of the chamber 10*b*.

The wheel axle 10 is transversely connected to a wheel supporter seat 12 that is connected to an underside of the deck 1 via a base plate 11. The seat 12 is formed of two openings 12*a* for engaging with two locating blocks 11*a* projected from the base plate 11. The locating blocks 11*a* are hollow members separately defining an inner space communicating with the base plate 11. Each locating block 11*a* has a hollow connecting head 11*b* projected therefrom for a protective sleeve 28 to connect an end thereto. Alternatively, the protective sleeve 28 may be integrally formed on the locating block 11*a*. Another end of the protective sleeves 28 are located adjacent to the chamber 10*a*, 10*b* for the wires 18 guided out of the chambers 10*a*, 10*b* to extend thereinto. The wires 18 pass through the protective sleeves 28 and the locating blocks 11*a* to connect to a control circuit unit 24 enclosed in the base plate 11.

Figures 6, 6A, 6B:
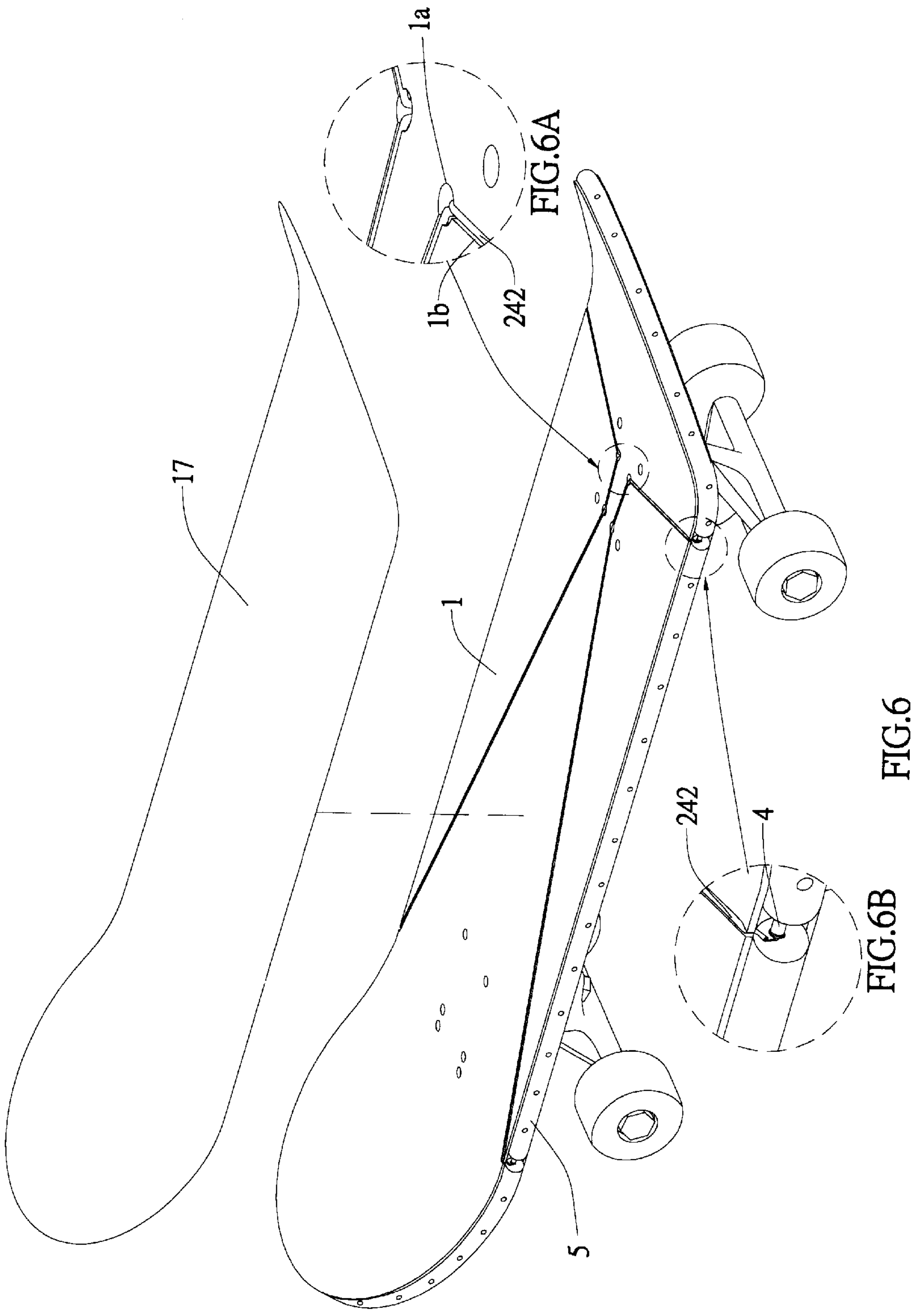
FIG. 6 is an exploded perspective view showing the connection of wires of the warning device of the present invention to light-emitting elements provided around the skateboard via wire grooves formed on a top of the skateboard, and the attachment of an antislip paper to the top of the skateboard.
FIG. 6A is a partially enlarged view of FIG. 6 showing the manner in which wires of the warning device of FIG. 6 are guided to the top of the skateboard.
FIG. 6B a partially enlarged view of FIG. 6 showing the manner in which wires of the warning device of FIG. 6 are guided and connected to the light-emitting element.

The control circuit unit 24 includes a switch 241*a* that projects from a through hole 11*c* on the base plate 11 to align with a through hole 12*b* on the wheel supporter seat 12, such that the switch 241*a* extends through the through hole 12*b* and is exposed beyond the seat 12 after the seat 12 has been connected to the base plate 11. The control circuit unit 24 includes wires 242 extended therefrom to pass through holes 1*a* provided on the deck 1, as shown in FIGS. 4, 6, and 6A, to reach the top of the deck 1. The wires 242 on the top of the deck 1 are then guided by wire grooves 1*b* formed on the deck 1 to the outer periphery of the deck 1 to connect to the at least one light-emitting element 4, as shown in FIG. 6B. After the at least one light-emitting element 4 is connected to the wires 242 and the at least one light-transferring strip 5 and attached to the outer periphery of the deck 1 as in the first embodiment, an antislip paper 17 is laid over the top of the deck 1 to complete the whole assembling of the light-producing warning device to the skateboard.

As in the first embodiment, the switch 241*a* of the control circuit unit 24 exposed from the wheel supporter seat 12 can be pushed by a user to send signals to the light-emitting element 4 for the same to emit continuous light, to emit intermittent light (that is, flashes), or to turn off. The continuous light or flashes emitted by the light-emitting element 4 pass the light-transferring strip 5 to illuminate the outer periphery of the deck 1. Similarly, the wires 242 connected to the at least one light-emitting element 4 may be further parallelly or serially connected to other light-emitting elements to provide increased brightness.

Since the wires 18 guided out of the chambers 10*a*, 10*b* are directly extended into the protective sleeves 28 without exposing them to external environments, the problems of a poorly connected light-emitting element 4 caused by broken wires 18 due to vibration, impact, or abrasive contact of the skateboard with other articles can be avoided. Moreover, since the wires 242 guided to the top of the deck 1 are received in the wire grooves 1*b* and covered by the antislip paper 17, they are well protected and would not adversely affect the overall appearance and function of the skateboard.

Moreover, as illustrated in FIGS. 1 and 4, the at least one light-emitting element 4 may be located so that it is received at two ends of the at least one light-transferring strip 5 that enables transfer of light from the light-emitting element 4 to the outer periphery of the deck 1 via the light-transferring strip 5.

The present invention has been described with a preferred embodiment thereof and it is understood that many changes and modifications in the described embodiment can be carried out without departing from the scope and the spirit of the invention as defined by the appended claims.

What is claimed is:

1. A light-producing warning device for skateboard, said skateboard including a deck, to an underside of which a seat of a wheel supporter is mounted via a base plate, said warning device comprising a case, a control circuit unit, a cover, and at least one light-emitting element; said case being fixedly connected to one side of said wheel supporter seat for receiving batteries and said control circuit unit therein; said control circuit unit being electrically connected to said batteries via battery leaf springs and including a switch corresponding to a push button fixedly provided on said cover, and having wires extended from one side thereof to connect to said least one light-emitting element; and said cover being closed onto said case; said light-producing warning device being characterized in that:

at least one light-transferring strip having a plurality of spaced through holes provided thereon is fixed to an outer periphery of said deck of said skateboard, and wherein said at least one light-emitting element extends around a periphery of said deck and is received at two ends of said light strip, wherein when said push button on said cover is pushed to touch said switch on said control circuit unit, said at least one light-emitting element is actuated to emit light that passes said at least one light-transferring strip to form light spots at said through holes on said at least one light-transferring strip, which provides a warning effect to ensure a user's safety, and wherein a plurality of said through holes also serve to provide spaces for fixing nails to extend therethrough and thereby connect said light-transferring strip to the outer periphery of said deck of said skateboard.

* * * * *